(12) United States Patent
Jakobs

(10) Patent No.: US 12,384,315 B2
(45) Date of Patent: Aug. 12, 2025

(54) COLLAPSING A DISPLAY DEVICE IN ORDER TO DEPLOY AN AIRBAG

(71) Applicant: AUDI AG, Ingolstadt (DE)

(72) Inventor: Bernd Jakobs, Nuremberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/273,636

(22) PCT Filed: Nov. 5, 2021

(86) PCT No.: PCT/EP2021/080726
§ 371 (c)(1),
(2) Date: Jul. 21, 2023

(87) PCT Pub. No.: WO2022/156927
PCT Pub. Date: Jul. 28, 2022

(65) Prior Publication Data
US 2024/0083250 A1    Mar. 14, 2024

(30) Foreign Application Priority Data

Jan. 22, 2021   (DE) ..................... 10 2021 101 375.5

(51) Int. Cl.
*B60R 21/013* (2006.01)
*B60K 35/00* (2006.01)
(Continued)

(52) U.S. Cl.
CPC .............. *B60K 35/00* (2013.01); *B60K 35/22* (2024.01); *B60K 35/53* (2024.01); *B60R 21/013* (2013.01);
(Continued)

(58) Field of Classification Search
CPC ..... B60R 21/205; B60R 21/013; B60R 21/16; B60R 21/20; B60R 2011/0005;
(Continued)

(56) References Cited

U.S. PATENT DOCUMENTS 5,691,695 A * 11/1997 Lahiff .................... B60K 35/60
340/459
9,643,560 B2 * 5/2017 Honmatsu ............. B60R 21/215
(Continued)

FOREIGN PATENT DOCUMENTS

DE    102005053176 A1 *  5/2007   ............. B60K 35/00
DE    102016001257 A1 *  9/2016
(Continued)

OTHER PUBLICATIONS

Translation by WIPO of International Preliminary Report on Patentability for International Appl. No. PCT/ EP2021/080726 dated Jul. 20, 2023.
(Continued)

*Primary Examiner* — Keith J Frisby
(74) *Attorney, Agent, or Firm* — STAAS & HALSEY LLP

(57) ABSTRACT

A method is disclosed for triggering at least one airbag, in particular a passenger airbag, positioned behind or next to a display apparatus, an impact being detected and at least one airbag being triggered via a control unit, a triggering unit being triggered in addition to the at least one airbag in order to destroy the display apparatus. Furthermore, an apparatus is disclosed, in particular for use in a vehicle.

10 Claims, 2 Drawing Sheets

(51) Int. Cl.
*B60K 35/22* (2024.01)
*B60K 35/53* (2024.01)
*B60R 21/205* (2011.01)

(52) U.S. Cl.
CPC ...... *B60R 21/205* (2013.01); *B60K 2360/652* (2024.01)

(58) Field of Classification Search
CPC ..... B60R 11/00; B60R 11/02; B60R 11/0229; B60R 11/0235; B60R 2021/161; B60K 35/00; B60K 35/22; B60K 35/50; B60K 35/53; B60K 2360/1523; B60K 2360/652; B60K 2360/816; B60K 2360/143; B60K 2360/1434; B60K 2360/1438
USPC ........................................................ 280/732
See application file for complete search history.

(56) References Cited

U.S. PATENT DOCUMENTS

| | | | | |
|---|---|---|---|---|
| 2004/0016588 | A1* | 1/2004 | Vitale | B60K 37/00 |
| | | | | 180/322 |
| 2010/0188204 | A1* | 7/2010 | Okada | B60K 35/00 |
| | | | | 340/457.1 |
| 2012/0074674 | A1* | 3/2012 | Ohoka | B60R 21/203 |
| | | | | 345/1.3 |
| 2014/0300090 | A1* | 10/2014 | Pechnyk | B60R 21/215 |
| | | | | 280/732 |
| 2016/0358997 | A1* | 12/2016 | Bae | H10K 59/38 |
| 2018/0086297 | A1* | 3/2018 | Bodtker | B62D 1/10 |
| 2020/0010041 | A1 | 1/2020 | Minakawa | |
| 2021/0122316 | A1* | 4/2021 | Freisler | B60N 2/14 |

FOREIGN PATENT DOCUMENTS

| | | | | |
|---|---|---|---|---|
| DE | 102016015254 A1 * | 5/2017 | | |
| DE | 102016010655 A1 * | 3/2018 | | |
| DE | 102017106240 A1 * | 9/2018 | | |
| DE | 10 2017 216 680 A1 | 3/2019 | | |
| DE | 10 2019 210 001 A1 | 1/2021 | | |
| DE | 10 2021 101 375.5 | 1/2021 | | |
| DE | 10 2019 131 010 B3 | 2/2021 | | |
| DE | 10 2020 007 862 A1 | 3/2021 | | |
| EP | 3372450 A1 * | 9/2018 | ............... | B60R 1/00 |
| EP | 3 722 136 A1 | 10/2020 | | |
| JP | 2014061849 A * | 4/2014 | | |
| JP | 2019-127102 A | 8/2019 | | |
| WO | WO-2005032893 A1 * | 4/2005 | ........... | B60R 21/203 |
| WO | PCT/EP2021/080726 | 11/2021 | | |

OTHER PUBLICATIONS

International Search Report dated Jan. 27, 2022 for International Application No. PCT/EP2021/080726 (4pp.).

* cited by examiner

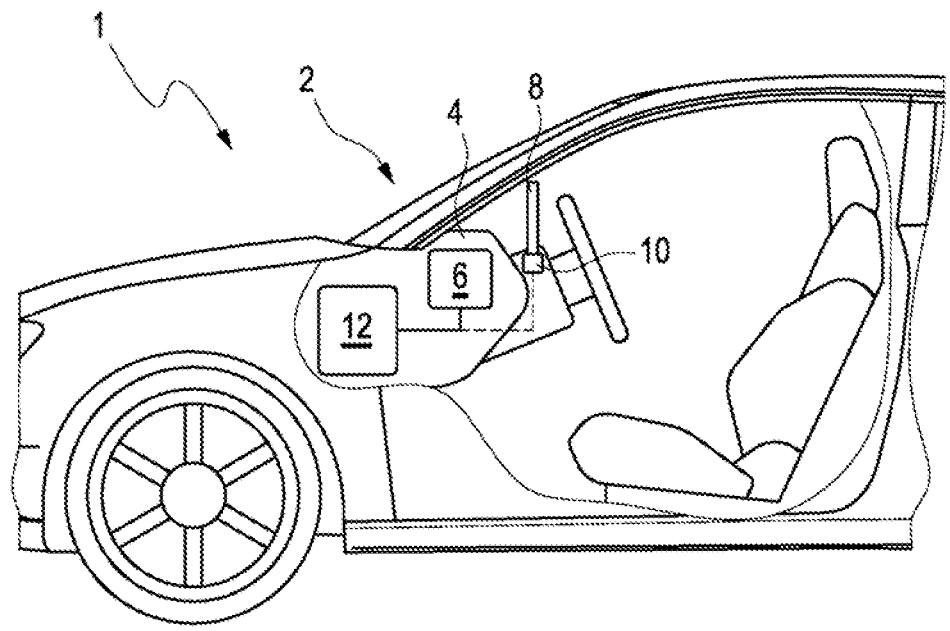
Fig. 1
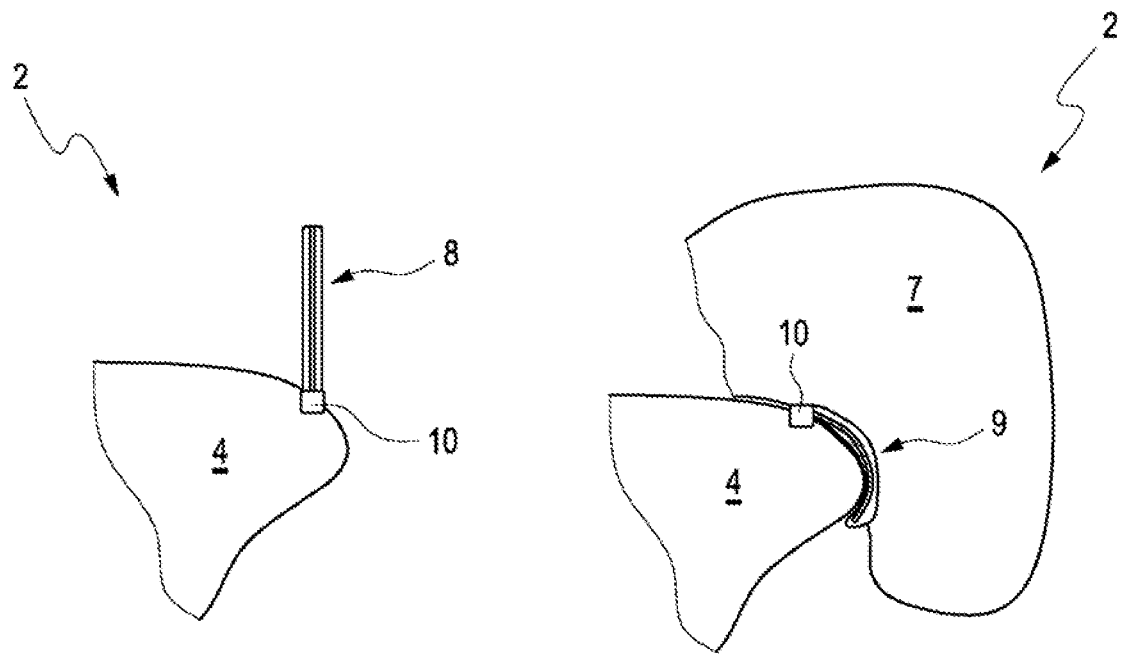
Fig. 2 a
Fig. 2 b

COLLAPSING A DISPLAY DEVICE IN ORDER TO DEPLOY AN AIRBAG

CROSS REFERENCE TO RELATED APPLICATIONS

This application is a U.S. national stage of International Application No. PCT/EP2021/080726, filed on Nov. 5, 2021. The International Application claims the priority benefit of German Application No. 10 2021 101 375.5 filed on Jan. 22, 2021. Both the International Application and the German Application are incorporated by reference herein in their entirety.

BACKGROUND

Disclosed herein is a method for triggering at least one airbag, in particular a passenger airbag, positioned behind or next to a display apparatus. Also disclosed herein is an arrangement for a vehicle.

Airbags and belts are used in vehicles in order to comply with safety regulations. In the case of a collision, the occupants of the vehicle can be restrained and protected against an impact against the steering wheel or the dashboard. In order to implement future requirements for new vehicle functions, increasingly large screens or display apparatuses are used in the region of the dashboard. In the case of larger and larger screens, a conflict of objectives increasingly arises in the process with the passenger airbag which is situated in the immediate vicinity.

With increasing dimensions of screens in the vehicle which were integrated as small displays in the center console in the past, an interaction of the airbag with the screen can occur during the unfurling of the airbag. Moreover, there is the risk that body parts of the occupant can collide with the screen or the display apparatus during the forward displacement in the case of an accident.

The current trend of arranging display apparatuses to be freestanding on the vehicle-side dashboard can therefore impair the functioning of the airbag and form an additional risk of injury for the occupants of the vehicle. Here, in particular, the triggered airbag can be damaged and its restraining effect can be reduced.

SUMMARY

It is the aspect of the present invention to provide a method and an arrangement, by way of which the danger of freestanding display apparatuses is decreased in the case of an accident.

The method according to an aspect of the invention serves to trigger at least one airbag, in particular at least one passenger airbag positioned behind or next to a display apparatus. Here, the method can be implemented in a vehicle environment.

At least one airbag positioned behind the display apparatus is situated behind the display apparatus in the viewing direction of a passenger. As a result, the display apparatus lies between the airbag and the passenger in the case of triggering of an airbag which is positioned in this way.

The at least one airbag positioned next to the display apparatus can be arranged substantially laterally next to the display apparatus. Depending on the configuration, an airbag of this type is positioned offset with respect to the display apparatus, and can interact at least in regions with the display apparatus in the case of triggering, in particular the airbag can collide with the display apparatus.

In the method according to an aspect of the invention, an impact is detected, and at least one airbag is triggered via a control unit. The impact, in particular an accident, can be registered via one or more sensors which are external or integrated into the control unit. To this end, for example, accelerometers, rate sensors, pressure sensors and the like are used.

According to an aspect of the invention, a triggering unit is triggered, in particular automatically, in addition to the at least one airbag in order to destroy the display apparatus.

The destruction of the display apparatus results in a safe collapse of the display apparatus or in a structural destabilization of the display apparatus, by way of which the at least one airbag is not impaired. As a result of this measure, the at least one passenger airbag can unfurl in an unimpeded manner, without coming into contact in the process with the screen or the display apparatus. Furthermore, the occupant protection can be ensured. In particular, in the case of oblique loading, the display apparatus can by way of the method be moved out of the collision region of the at least one airbag and/or the occupants of the vehicle.

The triggering unit is arranged, for example, on the display apparatus, in order to remove the display apparatus if required from an unfurling path of the airbag. A triggering unit of this type is configured as an apparatus-side triggering unit.

As an alternative or in addition, the arrangement of the triggering unit close to the display apparatus is possible, for example on or below the dashboard of the vehicle, in order to cause the destruction of the display apparatus as required.

The triggering unit can be coupled directly or indirectly to an airbag triggering operation. In particular, it can be possible for the triggering unit to be triggered by way of the control unit and/or mechanically by way of at least one airbag. For this purpose, an electronic or electromagnetic communications connection is provided between the control unit and the triggering unit, or a mechanical connection between the airbag and the triggering unit.

Depending on the embodiment, the triggering unit can have a sensor, by way of which an accident or an airbag triggering operation is detected, in order to activate the triggering unit in the case of a detected accident or airbag triggering operation.

In the case of one embodiment, the triggering unit is triggered by way of a pyrotechnic gas generator, a cold gas generator or by way of releasing a preloaded spring. The triggering unit may be arranged directly on the display apparatus, and may include a punch spike and a drive unit which can push the punch spike into the display apparatus in the case of an accident. The triggering unit can be triggered only after a predefined accident severity, with the result that the display apparatus remains intact in the case of non-critical accidents.

The display apparatus includes at least one glass layer, in particular a safety glass, on which the active components for visual display are arranged. Here, the display apparatus is based on LED, LCD, OLED and/or a comparable technology. Here, the safety glass can be of transparent or tinted or colored configuration. In particular, a tinted or colored safety glass can act as a rear wall for the active components.

In accordance with a further exemplary embodiment, a punch spike is driven into the display apparatus by way of the triggering of the triggering unit, and the display apparatus is destroyed. As a result of the driving of the punch spike by way of a drive unit of the triggering unit, the punch spike acts in a manner which corresponds to an emergency hammer and results in the destruction of the glass layer which gives the display apparatus its structural integrity. As a result, the display apparatus is moved out of the unfurling path of the at least one airbag before a collision with the airbag.

The triggering unit is configured as a pyrotechnic unit, as a preloaded spring with a locking apparatus, or as a cold gas generator.

Here, the triggering unit can be activated in parallel with or just before the triggering of the airbag or airbags. The display apparatus is collapsed, in order to clear the path for the activated airbags.

In accordance with a further embodiment, at least one glass layer, bonded to a safety film, of the display apparatus is fragmented and mechanically destabilized by way of the destruction of the display apparatus. Here, the safety film can be applied to the display apparatus on one side or on both sides. This measure prevents an uncontrolled release of glass splinters of the destroyed safety glass layer. During the collapsing of the display apparatus, the safety film maintains contact with the glass splinters by way of adhesive force, and therefore decreases the risk of injury for the occupants in the case of an accident.

In accordance with a further exemplary embodiment, the fragmented glass layer which is bonded to the safety film is collapsed by way of gravity or by way of the triggered airbag. The glass shards of the glass layer which are held together by way of the at least one safety film are no longer configured as a rigid display apparatus after the activation of the triggering unit. As a result, even gravity can cause the display apparatus, which includes glass shards of glass splinters, to collapse.

As an alternative, the unfurling airbag can fold over or fold away the destroyed display apparatus. Due to the resulting "softer" structure of the glass shards bonded to the safety film, rigid edges and corners are no longer present which can damage or impede the unfurling airbag.

In accordance with a further aspect of the invention, an arrangement (or apparatus) is provided, in particular, for use in a vehicle, and has at least one airbag and a control unit which is connected to the at least one airbag. Furthermore, the apparatus has at least one display apparatus which is positioned in front of or next to the at least one airbag in a deploying direction of the airbag.

The display apparatus has at least one active layer, at least one glass layer and at least one safety film. The safety film can be surrounded on both sides by in each case one glass layer. As an alternative, at least one glass layer can be covered on both sides by in each case one safety film. Bonding between the safety film and the glass layer takes place with the aid of an adhesive or an adhesive layer.

According to an aspect of the invention, a triggering unit for destroying the at least one glass layer is arranged on the display apparatus. By way of the triggering unit, the carrier structure, configured as a glass layer or safety glass, of the display apparatus can be destabilized and brought to collapse.

If an airbag activation occurs, the display apparatus is activated via the separate unit or triggering unit in such a way that the display apparatus collapses in a safe manner and clears the path for the unfurling airbag.

The at least one safety film includes a transparent plastic, and has an adhesive layer for fixing glass splinters. The glass splinters are therefore restrained by way of the safety film, as a result of which uncontrolled shattering of the display apparatus in the vehicle interior is avoided.

Furthermore, the air cushion of the airbag is protected against glass splinters with the aid of the safety film, and can completely deploy its restraining action. The components which are situated in the display or in the display apparatus such as, for example, active OLED components are likewise restrained and are placed in a defined manner over the dashboard after triggering of the triggering unit. As a result, no components are hurled into the vehicle interior.

In accordance with one exemplary embodiment, the triggering unit is arranged in the region of a fastening means (or fastener) of the display apparatus, or is configured as a fastening means (fastener) of the display apparatus. As a result of this measure, the triggering unit can be integrated in a particularly compact and unobtrusive manner into the display apparatus, or can be connected to the display apparatus.

In accordance with a further embodiment, the triggering unit has at least one punch spike which is directed in the direction of the display apparatus and can be driven against the display apparatus by way of a pyrotechnic gas generator, a cold gas generator or by way of releasing of a preloaded spring. As a result, the punch spike of the triggering unit can be driven in a flexible manner and can be used to collapse the display apparatus.

In the case of a further refinement, the preloaded spring is secured by way of a locking pin, the locking pin being moved electromagnetically or mechanically in order to release the preloaded spring. The locking pin prevents unintentional releasing of the preloaded spring. If the locking pin is removed during an accident, the preloaded spring can freely develop its spring force and therefore accelerate the punch spike against the display apparatus.

Releasing of the preloaded spring by way of mechanical releasing of the locking pin is possible, for example, by way of a mechanical connection between the locking pin and the airbag. Inter alia, a mechanical connection of this type can be configured by way of a cable or a strand or a lever.

In accordance with a further exemplary embodiment, the locking pin is moved mechanically by way of a triggered airbag. As a result, the triggered airbag can be used to remove the locking pin. For example, the locking pin can be connected via a cable to the airbag. A triggering unit which is configured in this way can be of technically particularly simple configuration and can be activated only when the airbag is triggered. As a result of this measure, erroneous triggering of the triggering unit can be avoided.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 shows a side view of a dashboard of a vehicle with an arrangement in accordance with one exemplary embodiment according to the invention, FIGS. 2a and 2b show detail views of an example of the dashboard from FIG. 1 before and after airbag triggering.

DETAILED DESCRIPTION

Figure 3:
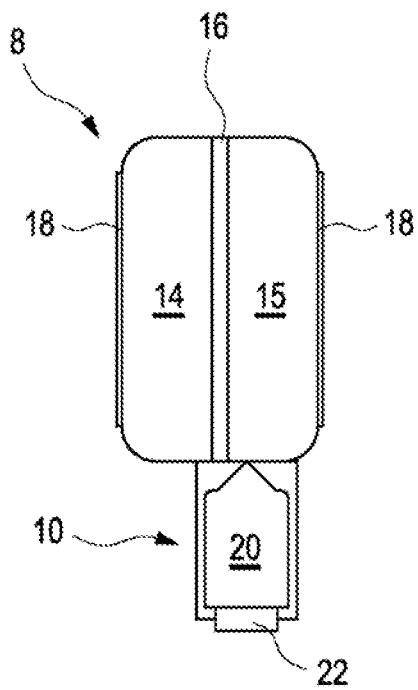
FIGS. 3a and 3b show an example of a triggering unit in accordance with a first embodiment before and after airbag triggering.
Figure 3:
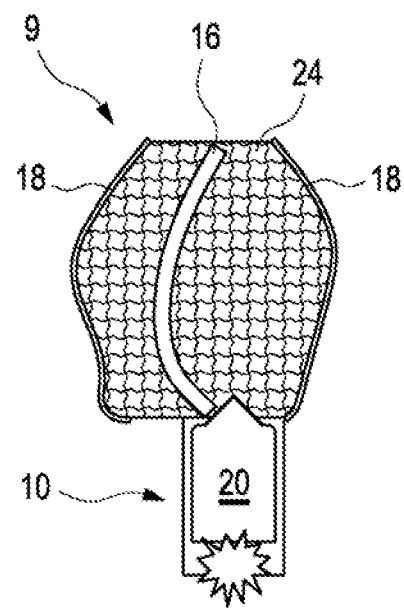

Reference will now be made in detail to the preferred embodiments, examples of which are illustrated in the accompanying drawings, wherein like reference numerals refer to like elements throughout.

FIG. 1 shows a side view of a vehicle 1 which has an arrangement (or apparatus) 2 according to an example of the invention. The arrangement 2 (apparatus) is arranged in the region of a dashboard 4 of the vehicle 1. In the exemplary embodiment which is shown, a front passenger side of the vehicle 1 is shown.

The arrangement (apparatus) 2 includes an airbag 6, a display apparatus 8 and a triggering unit 10. A control unit 12 is connected to the airbag 6, and can detect accidents and can correspondingly trigger the airbag 6 to inflate.

The control unit 12 can optionally also be used to trigger the triggering unit 10, as indicated by way of a dashed line.

In the description of the figures, one airbag 6, one control unit 12 and one display apparatus 8 are described for the sake of clarity. The arrangement (apparatus) 2 can comprise, however, a multiplicity of different airbags 6 and control units 12, which airbags 6 can be impaired in their unfolding by way of one or more display apparatuses 8. Here, the impairments of the airbag 6 can be taken into consideration in the case of triggering as a result of a frontal impact and/or a side impact of the vehicle 1.

The display apparatus 8 is configured by way of example as an OLED display and serves to visualize information or instructions, and to implement inputs in the vehicle 1.

FIG. 2a and FIG. 2b show detail views of the dashboard 4 or the arrangement (apparatus) 2 from FIG. 1 before and after airbag triggering. Here, FIG. 2b shows a triggered airbag 7 or an air cushion of the airbag 7 which is in a triggered state.

Figure 4:
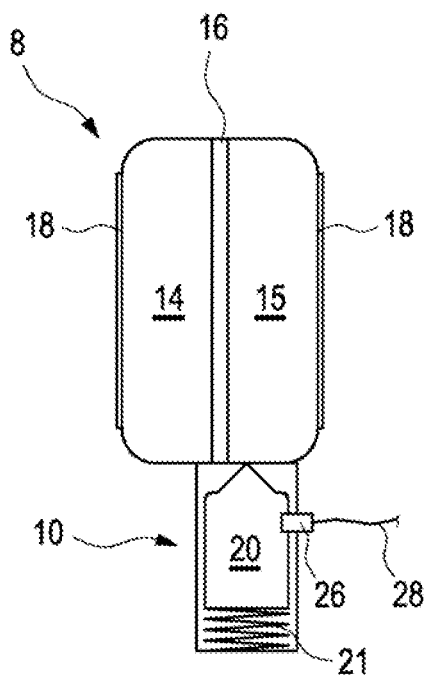
FIGS. 4a and 4b show an example of a triggering unit in accordance with a second embodiment before and after airbag triggering.
Figure 4:
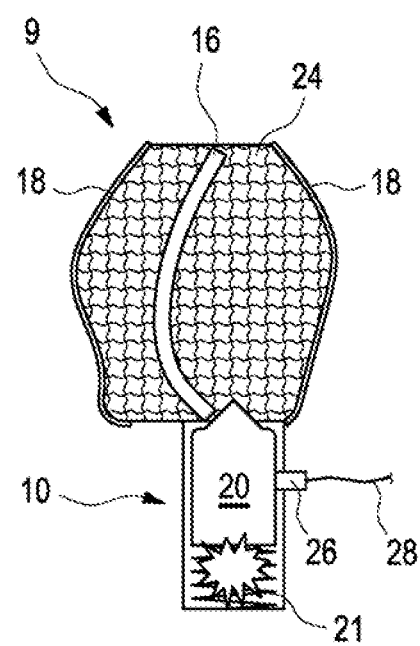

The display apparatus 8 includes a plurality of glass layers 14, 15 which are shown in FIGS. 3 and 4 and are configured as stabilizing structures or carrier structures, on which active components 16 for visual display are arranged.

The glass layers 14, 15 are configured as safety glass and give the display apparatus 8 a rectangular shape which is shown in the side view in FIG. 2a. The triggering unit 10 which allows the glass layers 14, 15 to collapse in the case of airbag triggering is situated at the base of the display or the display apparatus 8. The principle of the triggering unit 10 corresponds to that of an emergency hammer or safety hammer, by way of which an initial or controlled destruction is brought about. In the exemplary embodiment which is shown, the triggering unit 10 is configured as an apparatus-side triggering unit 10 and is arranged directly on the display apparatus 8.

As a result of the destruction of the glass layers 14, 15 with the aid of the triggering unit 10, the display apparatus 8 can collapse into a destroyed display apparatus 9. The destroyed display apparatus 9 is laid over the dashboard 4 by gravity and therefore does not impede the unfolding of the triggered airbag 7.

FIG. 3a and FIG. 3b show a triggering unit 10 and a display apparatus 8 in accordance with a first embodiment. Here, FIG. 3a illustrates the display device 8 and the triggering unit 10 in the case of normal operation of the vehicle 1. FIG. 3b illustrates the display apparatus 8 and the triggering unit 10 after airbag triggering.

The construction of the display apparatus 8 is clarified. The display apparatus 8 includes an active layer or other layer with active components 16, which layer is arranged between two glass layers 14, 15. The glass layers 14, 15 are configured as safety glass layers. Moreover, a safety film 18 is applied on the outer side to each glass layer 14, 15.

The triggering unit 10 comprises a punch spike 20 and a drive unit 22 of the punch spike 20. In the exemplary embodiment which is shown, the drive unit 22 is configured as a pyrotechnic gas generator or as a cold gas generator and serves for the initial action of force which accelerates the punch spike 20 against at least one of the glass layers 14, 15.

When the triggering unit 10 is activated, the tip of the punch spike 20 drills into the safety glass of at least one glass layer 14, 15 and causes it to collapse as carrier structure. Here, the respective glass layer 14, 15 disintegrates into a multiplicity of glass splinters 24 which are held together by way of the safety films 18.

The safety films 18 therefore restrain the glass splinters 24, and protect the airbag 6, in particular the triggered airbag 7, against possible damage. The active layer 16 and the glass splinters 24 can collapse in a controlled manner with the aid of the safety films 18, and can be laid over the contour of the dashboard 4. No components are therefore hurled into the interior of the vehicle 1.

FIG. 4a and FIG. 4b show, in particular, a triggering unit 10 in accordance with a second embodiment before and after airbag triggering. In contrast to FIGS. 3a and 3b, the triggering unit 10 has the punch spike 20 and a preloaded spring 21 as drive unit 22. A locking pin 26 blocks the preloaded spring 21 and prevents uncontrolled triggering of the triggering unit 10. In order to trigger the triggering unit 10, the locking pin 26 is removed or pulled, with the result that the preloaded spring 21 can be relieved and can accelerate the punch spike 20.

A wire connection 28 is shown by way of example which serves as a mechanical connection to the locking pin 26. The wire connection 28 can be connected to the airbag 6, with the result that, in the case of triggering of the airbag 6, the locking pin 26 is also removed and the display apparatus 8 is destroyed by way of the punch spike 20. The wire connection 28 can be configured, for example, as a catch strap or catch cable which is pulled by the triggered airbag 7.

As an alternative, the mechanical connection can be of rigid configuration and can be connected, for example, to an actuator (not shown).

LIST OF DESIGNATIONS

1 Vehicle
2 Arrangement (apparatus)
4 Dashboard
6 Airbag
7 Airbag in a triggered state
8 Display apparatus
9 Collapsed/destroyed display apparatus
10 Triggering unit
12 Control unit
14 First glass layer
15 Second glass layer
16 Active components/active layer
18 Safety film
20 Punch spike
21 Preloaded spring
22 Drive unit of the triggering unit
24 Glass fragments/fragmented glass layer
26 Locking pin
28 Wire connection/mechanical connection A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for triggering at least one airbag positioned in a vehicle behind or next to a display apparatus, the method comprising:
   detecting, by a control unit, an impact of the vehicle;
   triggering, by the control unit, at least one airbag; and
   triggering, by a triggering unit, destruction of the display apparatus by a punch spike in response to the detecting, by the control unit, the impact of the vehicle.

2. The method as claimed in claim 1, wherein the triggering unit is triggered by the control unit.

3. The method as claimed in claim 1, wherein the at least one airbag is at least one passenger airbag.

4. The method as claimed in claim 1, the triggering unit being triggered by a pyrotechnic gas generator, by a cold gas generator or by releasing a preloaded spring.

5. The method as claimed in claim 4, wherein the triggering, by the triggering unit, comprises driving the punch spike into the display apparatus to destroy the display apparatus.

6. The method as claimed in claim 4, at least one glass layer, bonded to a safety film, of the display apparatus being fragmented and mechanically destabilized by way of the destruction of the display apparatus.

7. The method as claimed in claim 1, wherein the triggering, by the triggering unit, comprises driving the punch spike into the display apparatus to destroy the display apparatus.

8. The method as claimed in claim 7, at least one glass layer, bonded to a safety film, of the display apparatus being fragmented and mechanically destabilized by way of the destruction of the display apparatus.

9. The method as claimed in claim 1, at least one glass layer, bonded to a safety film, of the display apparatus being fragmented and mechanically destabilized by way of the destruction of the display apparatus.

10. The method as claimed in claim 9, the fragmented glass layer bonded to the safety film being collapsed by gravity or by the at least one triggered airbag.

* * * * *